United States Patent
Griffin

(10) Patent No.: US 7,546,041 B2
(45) Date of Patent: Jun. 9, 2009

(54) OPTICAL COMMUNICATIONS

(75) Inventor: Robert Griffin, Towcester (GB)

(73) Assignee: Bookham Technology, PLC, Towcester (GB)

( * ) Notice: Subject to any disclaimer, the term of this patent is extended or adjusted under 35 U.S.C. 154(b) by 404 days.

(21) Appl. No.: 10/451,464

(22) PCT Filed: Dec. 18, 2001

(86) PCT No.: PCT/GB01/05624

§ 371 (c)(1),
(2), (4) Date: Dec. 2, 2003

(87) PCT Pub. No.: WO02/51041

PCT Pub. Date: Jun. 27, 2002

(65) Prior Publication Data

US 2004/0081470 A1  Apr. 29, 2004

(30) Foreign Application Priority Data

Dec. 21, 2000 (GB) .................................. 0031386.6

(51) Int. Cl.
H04B 10/04 (2006.01)
H04B 10/12 (2006.01)
(52) U.S. Cl. ........................................ 398/188; 398/198
(58) Field of Classification Search ................ 398/183, 398/188, 198, 79, 85, 159, 158, 185; 359/279
See application file for complete search history.

(56) References Cited

U.S. PATENT DOCUMENTS

| 4,893,352 | A |   | 1/1990 | Welford ........................ 398/198 |
| 5,101,450 | A | * | 3/1992 | Olshansky ..................... 385/3 |
| 5,222,103 | A | * | 6/1993 | Gross ........................... 375/281 |
| 5,930,015 | A |   | 7/1999 | Yamamoto et al. |
| 6,137,604 | A |   | 10/2000 | Bergano ........................ 398/1 |
| 6,335,814 | B1 | * | 1/2002 | Fuse et al. .................... 398/201 |

FOREIGN PATENT DOCUMENTS

| EP | 0297504 A2 | 1/1989 |
| EP | 0431527 B1 | 6/1991 |
| EP | 467266 A2 | 1/1992 |
| EP | 467266 A3 | 1/1992 |
| EP | 404054 B1 | 12/1997 |

(Continued)

OTHER PUBLICATIONS

Inoue Yasushi, "Optical Transmitter", Patent Abstracts of Japan, Publication No. 2000-092001, Publication Date: Mar. 31, 2000.*

(Continued)

Primary Examiner—M. R. Sedighian
(74) Attorney, Agent, or Firm—Lahive & Cockfield, LLP

(57) ABSTRACT

A method of transmitting a plurality n data streams comprises modulating an optical carrier using differential M-ary phase shift key (DMPSK) signalling in which $M=2^n$. Advantageously the method comprises using differential quaternary phase shift keying in which n=2. A particular advantage of the method of the present invention is that since the the data is differentially encoded in the form of phase changes rather than absolute phase values this enables the modulated optical carrier to be demolutated using direct detection without requiring a phase-locked local optical oscillator. The invention is particularly applicable to WDM communication systems.

16 Claims, 7 Drawing Sheets

FOREIGN PATENT DOCUMENTS

| | | |
|---|---|---|
| EP | 0977382 A2 | 2/2000 |
| GB | 2311915 A | 10/1997 |
| JP | 63-1220 | 1/1988 |
| JP | 63-52530 | 3/1988 |
| JP | 63-86608 | 4/1988 |
| JP | 64-5127 | 1/1989 |
| JP | 64-7727 | 1/1989 |
| JP | 3-21126 | 1/1991 |
| JP | 3-75615 | 3/1991 |
| JP | 3-174503 | 7/1991 |
| JP | 3-179939 | 8/1991 |
| JP | 3-259632 | 11/1991 |
| JP | 5-333223 | 12/1993 |
| JP | 9-214429 | 8/1997 |
| JP | 10-13342 | 1/1998 |
| JP | 10-145336 | 5/1998 |
| JP | 11-220443 | 8/1999 |
| JP | 11-331089 | 11/1999 |
| JP | 2000-59300 | 2/2000 |
| JP | 2000-92001 | 3/2000 |
| JP | 2000-106543 | 4/2000 |
| JP | 2000-157505 | 6/2000 |
| JP | 2000-209162 | 7/2000 |
| JP | 2002-543672 | 12/2002 |
| WO | WO-00/65790 A1 | 11/2000 |

OTHER PUBLICATIONS

Biernacki et al. "A two-channel optical downconverter for phase detection." *IEEE Transactions on microwave theory and techniques*, 1998;46(11):1784-1787.

Gross et al. "Optical dopsk video system with heterodyne detection." *IEEE Photonics Technology Letters* 1991;3(3):262-264.

Joyce et al. "Fiber distribution for 80 compressed digital video channels using differential QPSK." *Proceedings of the International Conference on Communications*, Geneva, May 23-26, 1993, IEEE 1993;3:1583-85.

Lima et al. "Optimization of apodized fiber grating filters for WDM systems." IEEE Lasers and Electro-optics Society, 1999, 12$^{th}$ Annual Meeting San Francisco, CA pp. 876-877.

Rohde, M. et al., "Robustness of DPSK direct detection transmission format in standard fibre WDM systems," *Electronics Letters*, vol. 36(17):1483-1484 (2000).

Yamazaki, Shuntaro et al., "Feasibility Study on QPSK Optical-Heterodyne Detection System," *Journal of Lightwave Technology*, vol. 8(11):1646-1653 (1990).

Biernacki, Paul D. et al., "A Two-Channel Optical Downconverter for Phase Detection," *IEEE Transactions on Microwave Theory and Technology*, vol. 46(11):1784-1787 (1998).

Gross, Richard et al., "Optical DQPSK Video System with Heterodyne Detection," *IEEE Photonics Technology Letters*, vol. 3(3):262-264 (1991).

Joyce, G.R. et al., "Fiber Distribution for 80 Compressed Digital Video Channels Using Differential QPSK," *IEEE International Conference on Communications*, vol. 3:1583-1585 (1993).

Lima, M.J.N. et al., "Optimization of apodized fiber grating filters for WDM systems," *IEEE Lasers and Electro-Optics Society 12th Annual Meeting*, vol. 2:876-877 (1999).

Japanese Office Action for Application No. 2002-552220, dated Jun. 19, 2007.

* cited by examiner

OPTICAL COMMUNICATIONS

RELATED APPLICATIONS

This application is a 35 U.S.C. 371 national stage filing of International Application No. PCT/GB01/05624, filed 18 Dec. 2001, which claims priority to Great Britain Patent Application No. 0031386.6 filed on 21 Dec. 2000 in Great Britain. The contents of the aforementioned applications are hereby incorporated by reference.

BACKGROUND OF THE INVENTION

This invention relates to optical communications and in particular to a method of modulating and demodulating an optical carrier. More especially the invention concerns a method and apparatus employing such modulation and demodulation for use in a wavelength division multiplex (WDM) optical communications system.

With ongoing developments in optically amplified dense wavelength division multiplex (DWDM) optical links as the backbone of point-to-point information transmission and the simultaneous increase in bit rate applied to each wavelength and the simultaneous increase in the number of channels, the finite width of the erbium gain window of conventional erbium-doped optical amplifiers (EDFAs) could become a significant obstacle to further increases in capacity. Conventional EDFAs have a 35 nm gain bandwidth which corresponds to a spectral width of 4.4 THz. System demonstrations of several Tbit/s are already a reality and the spectral efficiency, characterised by the value of bit/s/Hz transmitted, is becoming an important consideration. Currently, high-speed optical transmission employs binary amplitude keying, using either non-return-to-zero (NRZ) or return-to-zero (RZ) signalling formats, in which data is transmitted in the form of optical pulses having a single symbol level.

In WDM several factors limit the minimum channel spacing for binary amplitude signalling, and in practice spectral efficiency is limited to ~0.3 bit/s/Hz. Although increasing the per-channel bit rate tends to reduce system equipment, there are several problems that need to be overcome for transmission at bit rates above 10 Gbit/s; these being:

dispersion management of the optical fiber links, this becomes increasingly difficult with increased bit rate;

Polarisation mode dispersion (PMD) in the optical fiber causes increased signal degradation;

Realisation of electronic components for multiplexing, de-multiplexing and modulator driving becomes increasingly difficult.

One technique which has been proposed which allows an improvement of spectral efficiency is the use of quaternary phase shift keying (QPSK) [S. Yamazaki and K. Emura, (1990) "Feasibility study on QPSK optical heterodyne detection system", J. Lightwave Technol., vol. 8, pp. 1646-1653]. In optical QPSK the phase of light generated by a transmitter laser is modulated either using a single phase modulator (PM) driven by a four-level electrical signal to generate phase shifts of 0, p/2, p or 3p/2 representative of the four data states, or using two concatenated phase modulators which generate phase shifts of 0 or p/2 and 0 or 3p/2 respectively. A particular disadvantage of QPSK is that demodulation requires, at the demodulator, a local laser which is optically phase-locked to the transmitter laser. Typically this requires a carrier phase recovery system. For a WDM system a phase-locked laser will be required for each wavelength channel. It further requires adaptive polarisation control which, in conjunction with a phase recovery system, represents a very high degree of complexity. Furthermore, systems that require a coherent local laser are sensitive to cross-phase modulation (XPM) in the optical fiber induced by the optical Kerr non-linearity, which severely restricts the application to high capacity DWDM transmission.

It has also been proposed to use differential binary phase shift keying (DBPSK) [M. Rohde et al (2000) "Robustness of DPSK direct detection transmission format in standard fiber WDM systems", Electron. Lett., vol. 36]. In DBPSK data is encoded in the form of phase transitions of 0 or p in which the phase value depends upon the phase of the carrier during the preceding symbol interval. A Mach-Zehnder interferometer with a delay in one arm equal to the symbol interval is used to demodulate the optical signal. Although DBPSK does not require a phase-locked laser at the receiver it does not provide any significant advantages compared to conventional amplitude NRZ signalling.

SUMMARY OF THE INVENTION

The present invention has arisen in an endeavour to provide a signalling format for use in WDM which in part, at least, overcomes the limitations of the known arrangements.

According to the present invention a method of transmitting a plurality n data streams comprises modulating an optical carrier using differential M-ary phase shift key (DMPSK) signalling in which $M=2^n$. Advantageously the method comprises using differential quaternary phase shift keying in which $n=2$. A particular advantage of the method of the present invention is that since the data is differentially encoded in the form of phase changes rather than absolute phase values this enables the modulated optical carrier to be demodulated using direct detection without requiring a phase-locked local optical oscillator.

The present invention finds particular application in WDM communication systems and according to a second aspect of the invention an optical wavelength division multiplex communication system is characterised by the optical wavelength channels being modulated in accordance with the above method. To improve spectral efficiency by reducing wavelength channel separation the WDM system advantageously further comprises optical filtering means for optically filtering each DMPSK modulated wavelength channel before multiplexing them to form a WDM signal and wherein the optical filtering means has a characteristic which is selected such as to minimise inter-symbol interference at the sample time for each symbol. Preferably the optical filtering means has a characteristic which is a squared raised-cosine. Advantageously the filtering means has a transmission characteristic $G(f)$ given by:

$$G(f) = \begin{cases} 1 \text{ for } 0 \leq |f - f_0| \leq \dfrac{1-\alpha}{2T} \\ \dfrac{1}{4}\left(1 - \sin\left[\dfrac{\pi T}{\alpha}\left(|f - f_0| - \dfrac{1}{2T}\right)\right]\right)^2 \text{ for } \dfrac{1-\alpha}{2T} \leq |f - f_0| \leq \dfrac{1+\alpha}{2T} \\ 0 \text{ for } |f - f_0| > \dfrac{1+\alpha}{2T} \end{cases}$$

where T is the sampling period at the demodulator (i.e. 1/line symbol rate), a the excess bandwidth factor of the filter and $f_0$ the centre frequency of the WDM channel.

Preferably the filter has an excess bandwidth factor of between 0.2 and 0.8. Advantageously the optical filtering means comprises a respective optical filter for each wavelength channel. For ease of integration each filter advantageously comprises an optical fiber Bragg grating.

According to a further aspect of the invention a modulator arrangement for modulating an optical carrier using a quaternary differential phase shift key in dependence upon two data streams comprises: two Mach Zehnder interferometers operable to selectively modulate the phase by ±p radians in dependence upon a respective drive voltage; a fixed phase shifter for applying a phase shift of p/2 and means for generating the respective drive voltages in dependence upon the two data streams and are such that the data streams are encoded in the phase transitions generated by the interferometers.

Advantageously each interferometer has an optical transmission versus drive voltage characteristic which is cyclic and which has a period of $V_{2p}$ volts and in which the modulators are operable on a part of said characteristic to give minimum transmission and in which the drive voltages have values of $±V_p$.

According to yet a further aspect of the invention a modulator arrangement for modulating an optical carrier using a quaternary differential phase shift key (QPSK) in dependence upon two data streams comprises: phase modulating means operable to selectively modulate the phase of the optical carrier with phase shifts of 0, p/2, p, 3p/2 radians in dependence upon the two data streams. Advantageously the phase modulating means comprises optical splitting means for splitting the optical carrier into two optical signals which are applied to a respective Mach Zehnder modulator which is operable to selectively modulate the phase of the optical signal by ±p radians in dependence upon a respective drive voltage; a fixed phase shifter for applying a phase shift of p/2 to one of said optical signals; and means for combining said modulated optical signals to produce the DQPSK modulated signal.

Preferably with such an arrangement each Mach Zehnder modulator has an optical transmission versus drive voltage characteristic which is cyclic and which has a period of $2V_p$ and in which the modulators are operable on a part of said characteristic to give minimum transmission and in which the drive voltages have values of $±V_p$.

According to a further aspect of the invention a demodulator arrangement for demodulating a quaternary differential phase shift key (DQPSK) modulated optical signal comprises: optical splitting means for splitting the DQPSK modulated optical signal, two unbalanced Mach Zehnder interferometers to which respective parts of the modulated optical signal are applied; and a respective balanced optical to electrical converter connected across the optical outputs of each interferometer; wherein each Mach Zehnder interferometer has an optical path length difference between its respective arms which corresponds with substantially the symbol period of the modulated signal and in which one interferometer is operable to further impart a relative phase shift of p/2 radians. In a particularly preferred arrangement the Mach Zehnder interferometers are respectively operable to impart phase shifts of p/4 and -p/4 radians. Such an arrangement ensures that the demodulated outputs are symmetrical NRZ signals.

The use of optical filtering as described above is considered inventive in its own right irrespective of the modulation format. Thus according to yet a further aspect of the invention a WDM communications system of a type in which data is transmitted in the form of a plurality of modulated optical carriers of selected wavelengths is characterised by optical filtering means for filtering each modulated carrier before multiplexing them to form a WDM signal and wherein the optical filtering means has an optical characteristic which is selected such as to minimise inter-symbol interference at the sample time for each symbol.

Preferably the optical filtering means has a characteristic as described above. Advantageously the optical filtering means comprises a respective optical filter, preferably a fiber Bragg grating, for each wavelength channel.

BRIEF DESCRIPTION OF THE DRAWINGS

In order that the invention can be better understood a modulator and demodulator arrangement in accordance with the invention will now be described by way of example only with reference to the accompanying drawings in which.

DESCRIPTION OF THE ILLUSTRATED EMBODIMENT

Figure 1:
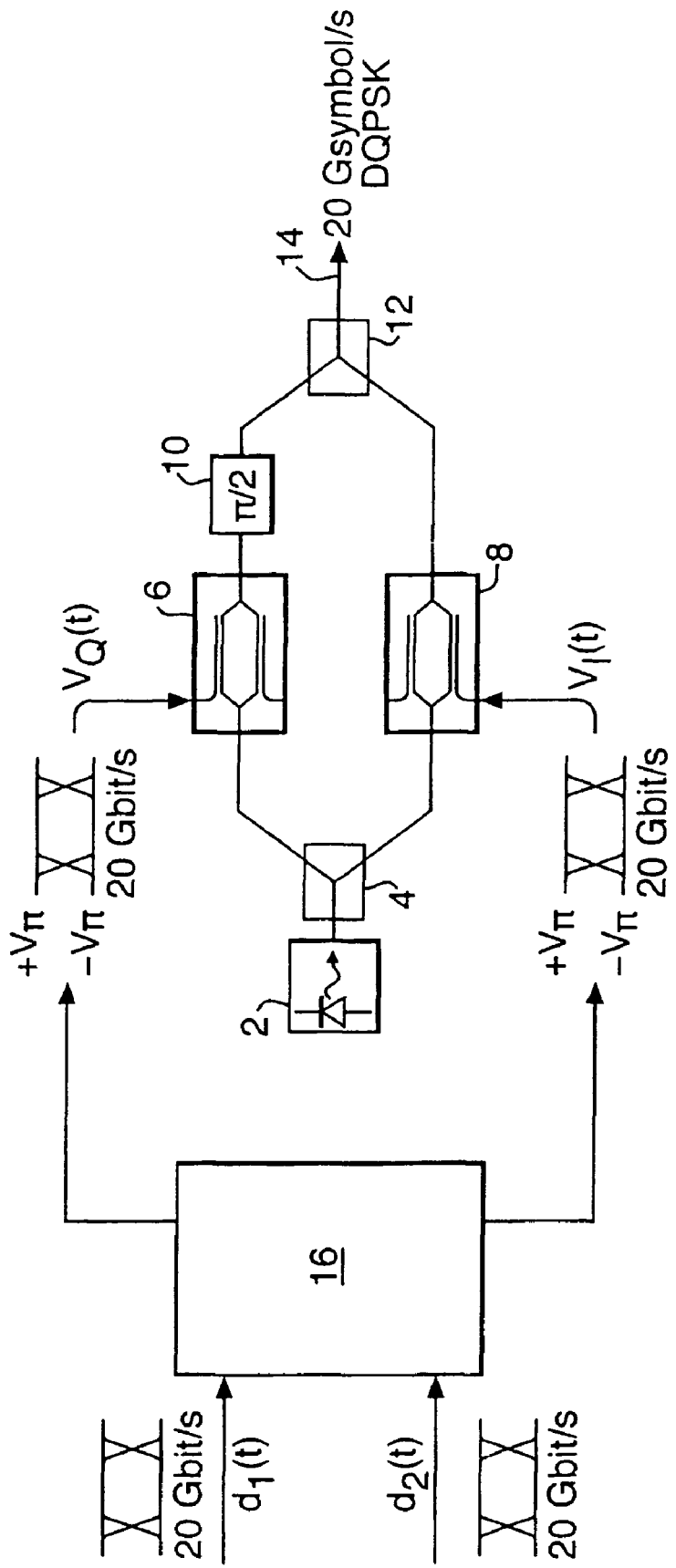
FIG. 1 is a schematic representation of an optical modulator arrangement in accordance with the invention.

Referring to FIG. 1 there is shown an optical phase shift key modulator arrangement in accordance with the invention for encoding two 20 Gbit/s NRZ data streams $d_1(t)$, $d_2(t)$ onto a single optical carrier. Typically the modulator arrangement would be used as part of a transmitter in a WDM optical communications system with a respective modulator arrangement for each WDM wavelength channel.

The modulator arrangement comprises a single frequency laser 2, for example a distributed feedback (DFB) semiconductor laser due to its stable optical output for a given wavelength, which is operated to produce an unmodulated optical output of a selected wavelength, typically a WDM wavelength channel. Light from the laser is divided by an optical splitter 4 into two parts and each part is applied to a respective phase modulator 6, 8. Each phase modulator 6, 8 is configured such that it selectively modulates the phase by 0 or p radians in dependence upon a respective binary (bipolar) NRZ drive voltage $V_1(t)$, $V_Q(t)$. In the preferred arrangement illustrated in FIG. 1 the phase modulators 6, 8 each comprise a Mach-Zehnder electro-optic modulator (MZM) which is fabricated for example in gallium arsenide or lithium niobate. As is known MZMs are widely used as optical intensity modulators and have an optical transmission versus drive voltage characteristic which is cyclic and is generally raised cosine in nature.

The half period of the MZM's characteristic, which is measured in terms of a drive voltage, is defined as $V_p$. Within the modulator arrangement of the present invention each MZM 6, 8 is required to operate as a phase modulator without substantially affecting the amplitude (intensity) of the optical signal. To achieve this each MZI 6, 8 is biased for minimum optical transmission in the absence of a drive voltage and is driven with a respective drive voltage $V_1(t)$, $V_Q(t) = \pm V_p$ to give abrupt phase shifting with a minimum of amplitude modulation. The two phase modulators 6, 8 have matched delays (phase characteristics).

The optical output from the phase modulator 6 is passed through a fixed phase shifter 10 which applies a fixed phase shift of $p/2$ such that the relative phase difference between the optical signals passing along the path containing the modulator 6 and that passing along the path containing the modulator 8 is $\pm p/2$. The optical signals from the fixed phase shifter 10 and phase modulator 8 are recombined by an optical recombiner 12, for example a 3 dB coupler, to form an optical phase shift key (PSK) output 14.

The phase modulator drive voltages, $V_1(t)$, $V_Q(t)$ are generated by pre-coding circuitry 16 in dependence upon the two binary data streams $d_1(t)$, $d_2(t)$. According to the modulator arrangement of the present invention the two data streams $d_1(t)$, $d_2(t)$ are differentially encoded such that these data are encoded onto the optical signal 14 in the phase transitions (changes) rather than in the absolute phase value. As a result it will be appreciated that the optical signal 14 is differential quaternary phase shift key (DQPSK) encoded. The use of DQPSK to modulate an optical signal is considered inventive in its own right.

The DQPSK optical signal 14 is ideally given by $E_0 \exp(i\omega t + \theta + \theta_i)$, where $\omega$ is the mean optical angular frequency, t is time, $\theta$ the carrier phase (NB: as discussed below this is arbitrary in that it is does not need to be known to subsequently demodulate the signal) and $\theta_i$ a data dependent phase modulation for the i-th data symbol $d_i$. In the general case $d_i \in \{0, 1, \ldots M-1\}$ and for quarternary phase shift keying M=4, that is the data symbol has four values. The phase modulation term is given by $\theta_i = \theta_{i-1} + \Delta\theta_i(d_i)$ in which $\theta_{i-1}$ is the phase term for the previous data symbol $d_{i-1}$ and $\Delta\theta_i$ the change in phase between the $i_{-1}$ and i-th data symbols. The relationship between data symbol $d_i$ and phase shift $\Delta\theta_i$ for QPSK is tabulated below.

TABLE 1

Values of data $d_1(t)$, $d_2(t)$, data symbol $d_i$ and phase change $\Delta\theta_i(d_i)$ for DQPSK.

| $d_1(t)$ | $d_2(t)$ | $d_i$ | $\Delta\theta_i(d_i)$ |
|---|---|---|---|
| 0 | 0 | 0 | 0 |
| 0 | 1 | 1 | p/2 |
| 1 | 0 | 2 | p |
| 1 | 1 | 3 | 3p/2 |

It is to be noted that the mapping between data, data symbol and phase change is just one example and that other mappings can be used. The pre-coding circuitry 16, a functional representation of which is shown in FIG. 2, is configured such as to produce the appropriate drive voltages $V_1(t)$, $V_Q(t)$ in dependence upon the two data streams $d_1(t)$, $d_2(t)$ according to the relationships:

$$V_1(i) = V_1(i-1)\cos\Delta\theta(d_i) - V_Q(i-1)\sin\Delta\theta(d_i) \quad \text{Eq. 1}$$

$$V_Q(i) = V_1(i-1)\sin\Delta\theta(d_i) + V_Q(i-1)\cos\Delta\theta(d_i) \quad \text{Eq. 2}$$

Figure 2:
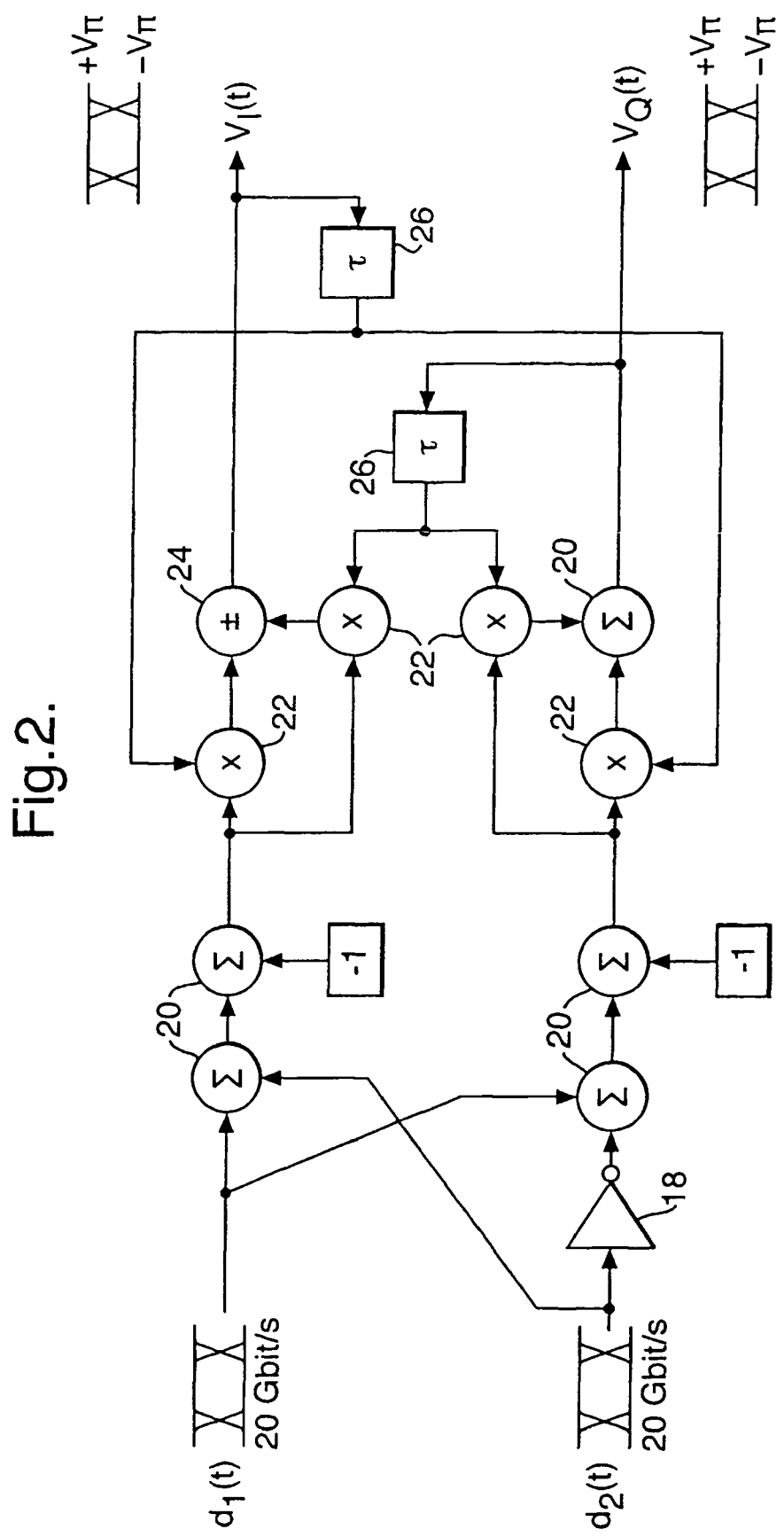
FIG. 2 is a representation of the functional elements of the pre-coding circuitry of the modulator arrangement of FIG. 1.

In FIG. 2 elements having the same functionality are given like reference numerals and respectively comprise an inverter 18, summing elements 20, multiplying elements 22, subtracting elements 24 and delay elements 26. The delay elements 26 have a delay t corresponding to symbol period which for a 20 Gsymbol/s line rate is approximately 50 ps.

Figure 3:
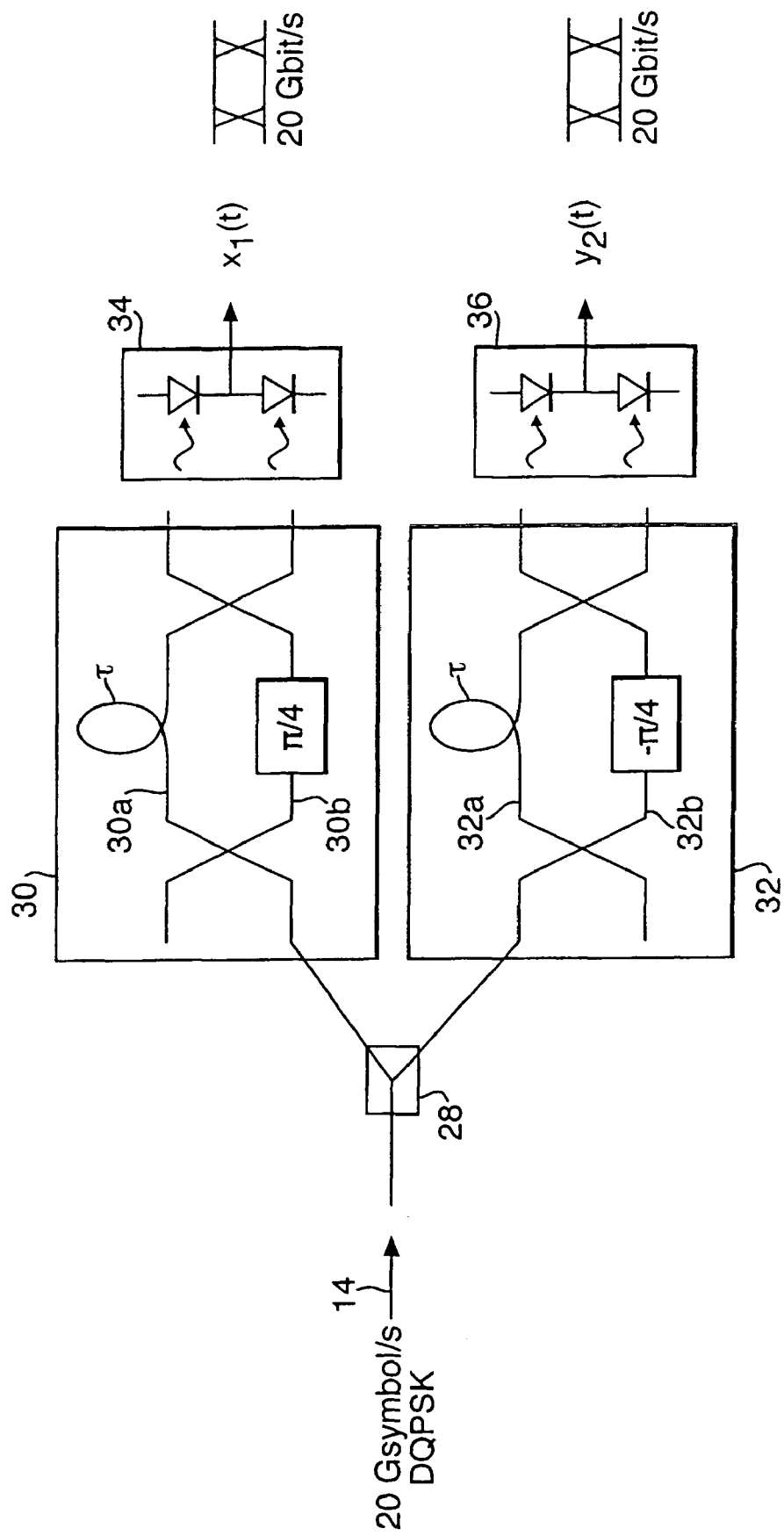
FIG. 3 is a schematic representation of an optical demodulator arrangement in accordance with the invention.

Referring to FIG. 3 there is shown a demodulator arrangement in accordance with the invention. The demodulator comprises an optical splitter 28 for splitting the received DQPSK modulated optical signal 14 into two parts which are applied to a respective unbalanced Mach-Zehnder interferometer (MZI) 30, 32. Typically the MZIs are fabricated in gallium arsenide or lithium niobate. A respective balanced optical to electrical converter 34, 36 is connected across the optical outputs of each MZI 30, 32. Each MZI 30, 32 is unbalanced in that each has a time delay $\tau$, nominally equal to the symbol period (50 ps for a 20 Gsymbol/s line rate) of the data modulation rate, in one arm 30a, 32a relative to that of the other arm 30b, 32b. The time delay $\tau$, is introduced by making the optical path length of the two arms different and for ease of fabrication is introduced by making the physical length of the MZI's arm 30a, 32a longer than the other arm 30b, 32b. Each MZI 30, 32 is respectively set to impart a relative phase shift of $p/4$ and $-p/4$ by the application of an appropriate voltage to electrodes on the shorter arm 30b, 32b. With balanced detection the output electrical signals $x_1(t)$, $y_2(t)$ from the converters 34, 36 is given by:

$$x_1(t), y_2(t) = \cos(\Delta\theta(d_i)) \pm \sin(\Delta\theta(d_i)) \quad \text{Eq. 3}$$

For DQPSK where $\Delta\theta(d_i)$ takes the possible values $\{0, p/2, p, 3p/2\}$ the outputs are hence binary (bipolar) signals given by:

$$x_1(t) = d_1(t) \text{ and } y_2(t) = d_2(t).$$

A particular benefit of setting the MZIs 30, 32 to impart relative phase shifts between their arms of $p/4$ and $-p/4$ respectively is that this results in the de-modulated signals $x_1(t)$, $y_2(t)$ being symmetrical bipolar NRZ signals. It will be appreciated that the in-phase and quadrature components of the DQPSK signal can also be demodulated using other relative phase shifts provided there is a difference of $p/2$ between the respective MZIs, though the resulting signals will not be symmetrical bipolar NRZ signals. In the general case, therefore, the MZI 30 is set to impart a phase shift $f$ and the MZI 32 set to impart a phase shift $f \pm p/2$.

Figure 4:
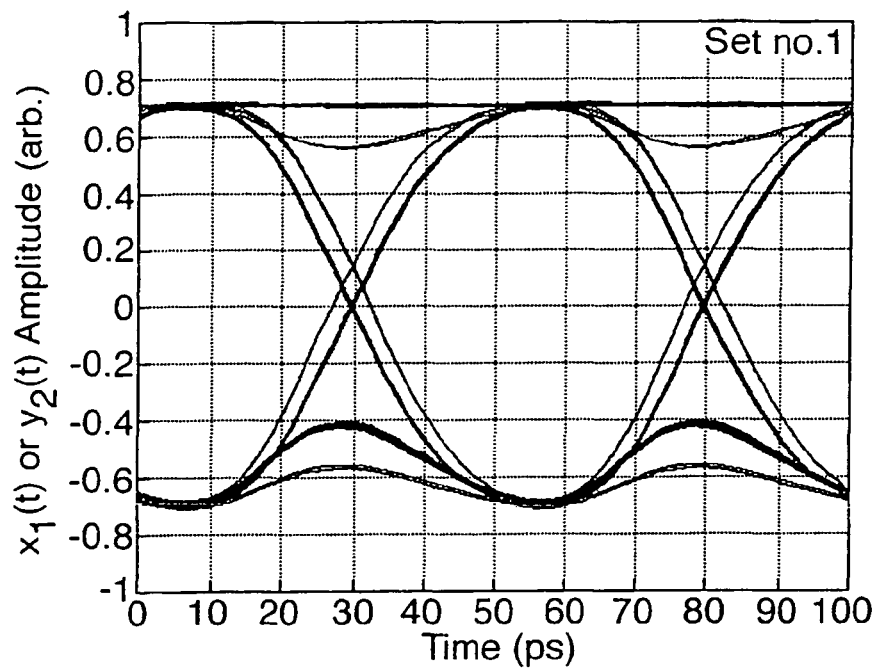
FIG. 4 is a simulated 20 Gbit/s "eye" diagram for one output of the demodulator arrangement of FIG. 3.
Figure 5:
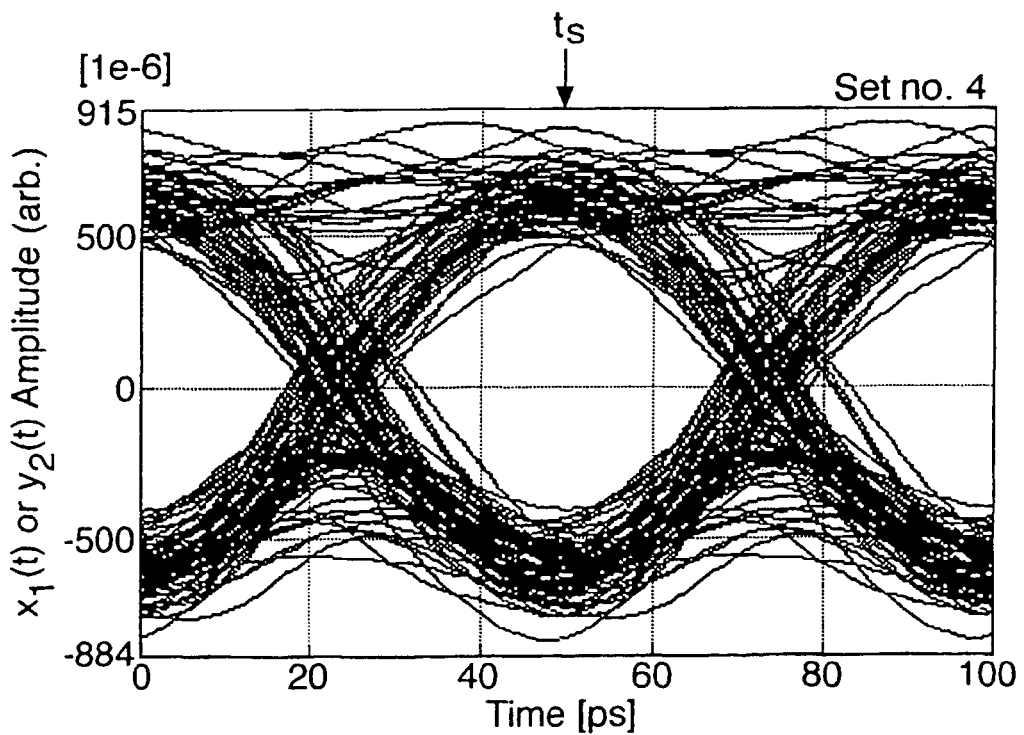
FIG. 5 is a simulated 20 Gbit/s "eye" diagram for transmission over a 600 km optically amplified, dispersion-managed optical fibre link and includes Signal-ASE (Amplitude Spontaneous Emission) noise.

Referring to FIG. 4 there is shown a simulated "eye" diagram for one of the demodulated electrical signals $x_1(t)$ or $y_2(t)$ for a 20 Gbit/s data stream for a communications system incorporating the DQPSK modulator and demodulator arrangement of the FIGS. 1 and 3. FIG. 5 shows a further simulated "eye" diagram for the same system for transmission over a 600 km optically amplified, dispersion managed optical fiber link and further includes Signal-ASE (Amplitude Spontaneous Emission) noise.

A particular advantage of the signalling format of the present invention is its improved spectral efficiency. Simulations of a DWDM optical link comprising 40 Gbit/s channels with a 50 GHz spacing (0.8 bit/s/Hz spectral efficiency) indicate that such a system is quite viable without requiring polarisation multiplexing/interleaving.

As well as improved spectral efficiency DQPSK offers a number of advantages compared to other signalling formats such as binary amplitude and binary phase shift signalling. Optical DQPSK provides a higher tolerance to chromatic dispersion and a higher tolerance to polarisation mode dispersion. A further advantage is that the electrical and optoelectronic components operate with a bandwidth commensurate with half the line bit rate. Compared to coherent QPSK, optical DQPSK provides improved tolerance to cross-phase modulation (XPM) since the signal is differentially encoded as a phase difference (change) between successive data bits whilst XPM will in general be common to successive data bits. Since optical DQPSK does not require a phase-coherent local oscillator for demodulation this eliminates the need for adaptive polarisation control. Since modulation and demodulation for optical DQPSK is functionally relatively straightforward it can readily be implemented using robust and compact electro-optic compact circuits such as phase modulators, optical couplers, splitters etc which can be readily integrated in the form of monolithic waveguide devices.

Initial simulations indicate that optical DQPSK is a viable signalling format for transmission of multiple 40Gb/s DWDM communication channels with tera bit/s capacity over a single optical fiber it is also envisaged that combined with Raman amplification and forward error correction (FEC), optical DQPSK signalling offers the potential for tera bit/s transmission over several thousands of kilometers of optical fiber.

One of the limiting factors for improving spectral efficiency in WDM systems is that tight optical filtering of the modulated wavelength channels before multiplexing using known optical filters (Butterworth) causes inter-symbol interference (ISI) thereby degrading system performance. To overcome this problem the inventor has appreciated that the system performance can be further improved by using optical filtering if its characteristic is carefully selected such as to minimise ISI at the sampling times $t_s$ for the data symbols. For DQPSK the optical spectrum is close to an ideal "sinc" (sin x/x) function and consequently the side lobes are quite high compared to other signalling formats. By optically filtering each DQPSK wavelength channel using an optical filter whose optical characteristic (response) is tailored (shaped) such as to minimise ISI for each symbol at the sampling times this reduces spectral overlap of adjacent channels and limits the amount of received noise. Ideally the filter response should achieve pulse shaping such that the received pulse shape p satisfies:

$$p(iT - kT) = \begin{cases} 1, i = k \\ 0, i \neq 0 \end{cases}$$

where T is the sampling period (line symbol period=1/line rate).

In an idealised system in which the symbols have a perfect impulse response the filter function is required to have a linear phase and frequency-dependent transmission characteristic G(f) which is a squared raised cosine which is given by:

$$G(f) = \begin{cases} 1 \text{ for } 0 \leq |f - f_0| \leq \frac{1-\alpha}{2T} \\ \frac{1}{4}\left(1 - \sin\left[\frac{\pi T}{\alpha}\left(|f - f_0| - \frac{1}{2T}\right)\right]\right)^2 \text{ for } \frac{1-\alpha}{2T} \leq |f - f_0| \leq \frac{1+\alpha}{2T} \\ 0 \text{ for } |f - f_0| > \frac{1+\alpha}{2T} \end{cases} \quad \text{Eq. 4}$$

where $\alpha$ is the roll-off factor or excess bandwidth factor and $f_0$ is the centre frequency of the WDM channel. Typically the filter is selected to have an excess bandwidth factor of 0.2 to 0.8. By analogy with RF signalling the optical filtering in accordance with the present invention with hereinafter be referred to as optical Nyquist filtering.

Preferably the optical nyquist filtering function is split between optical Nyquist filters located at the transmitter and receiver. The transmitter optical filter is preferably connected to the output of the modulator arrangement such that each wavelength channel is filtered before multiplexing the channels and the receiver optical filter located after de-multiplexing of the WDM optical signal and before demodulation of the DQPSK signal.

Figure 6A:
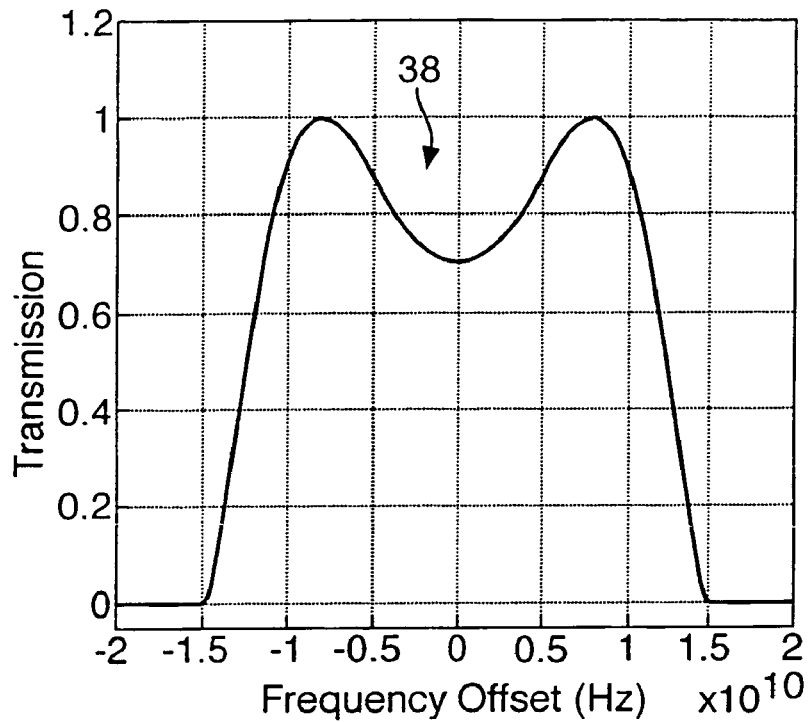
FIG. 6 shows optical transmission characteristics for (a) a transmitter optical filter in accordance with the invention and (b) a receiver optical filter in accordance with the invention.
Figure 6B:
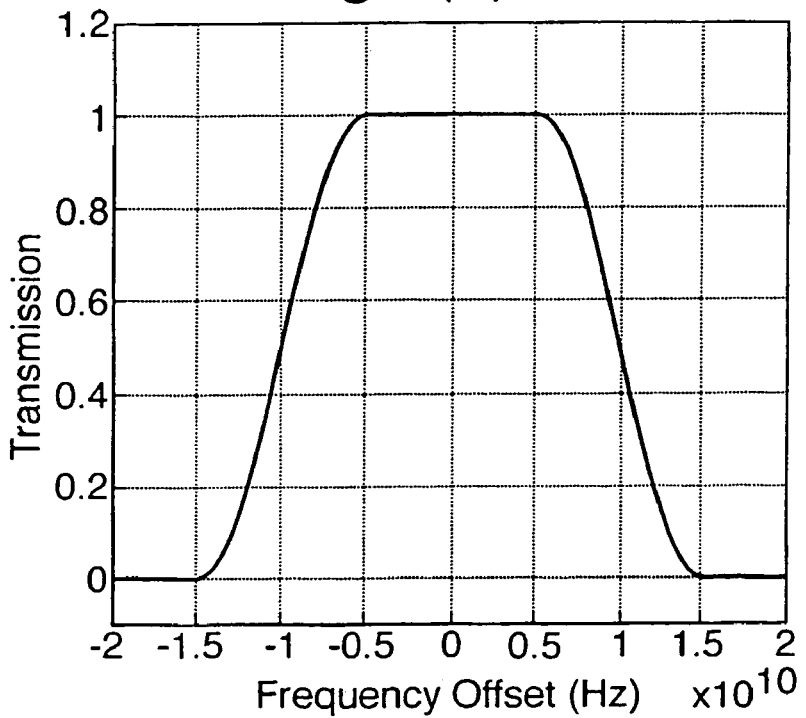

The optical characteristics of the transmitter and receiver Nyquist filters are illustrated in FIGS. 6(a) and 6(b). Referring to FIG. 6(b) the receiver Nyquist filter characteristic comprises a squared raised cosine function, as defined by Eq. 4, with a total bandwidth of 30 GHz that is centered about the WDM wavelength channel (the WDM wavelength channel $f_0$ is indicated as zero on the frequency axis of FIG. 6), that is the excess bandwidth factor a is 0.5 for a 20 Gsymbol/s line rate. The transmitter filter characteristic, FIG. 6(a), also essentially comprises a squared raised-cosine function but is further modified in the bandpass region 38

$$\left(0 \leq |f - f_0| \leq \frac{1-\alpha}{2T}\right)$$

to have a 1/"sinc" function to take account of the finite pulse width of the transmitted symbols. Preferably the transmitter and receiver Nyquists are fabricated in the form of optical fiber Bragg gratings or a grating structure defined within an optical waveguide.

Figure 7:
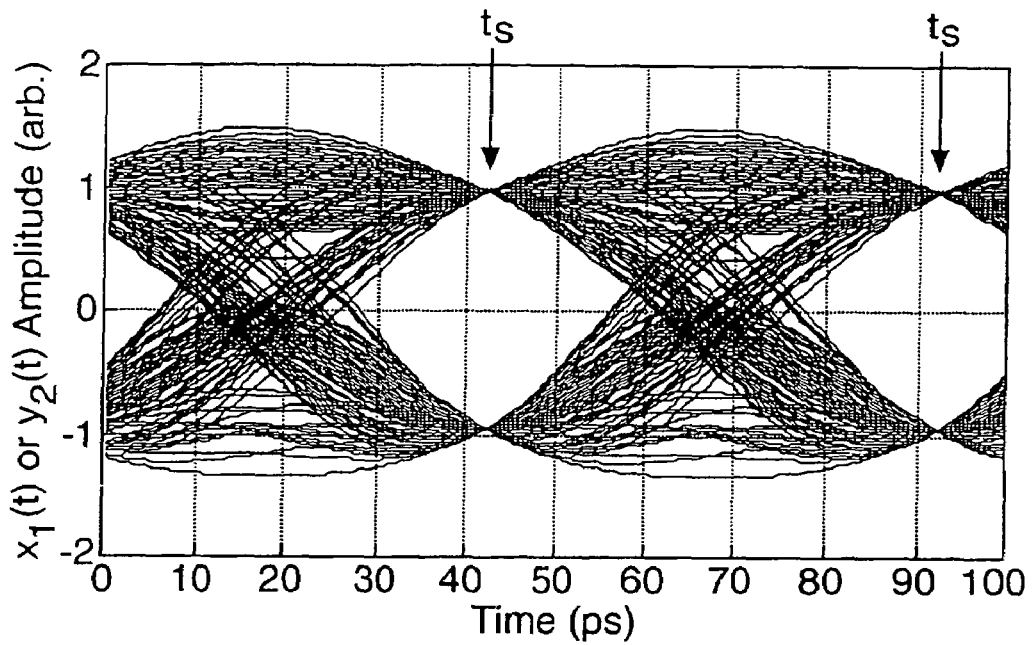
FIG. 7 is a simulated 20 Gbit/s "eye" diagram of FIG. 4 and further including optical filtering in accordance with the invention.
Figure 8:
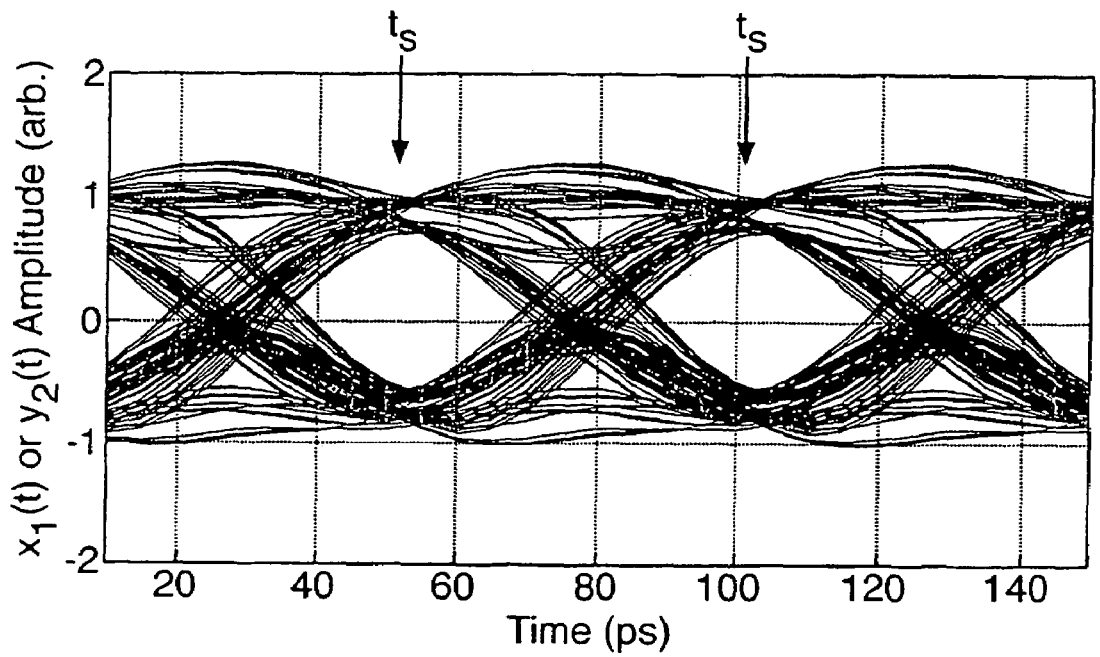
FIG. 8 is a simulated 20 Gbit/s "eye" diagram of FIG. 4 and further including conventional (Butterworth response) optical filtering.

Referring to FIG. 7 this illustrates the resulting effect on the simulated eye of FIG. 4 of the transmitter and receiver Nyquist filters. It is to be noted that the filters have the effect that the "eye" has near zero ISI at the sampling times $t_s$. For comparison FIG. 8 shows the same "eye" for conventional filtering (Butterworth response).

Figure 9A:
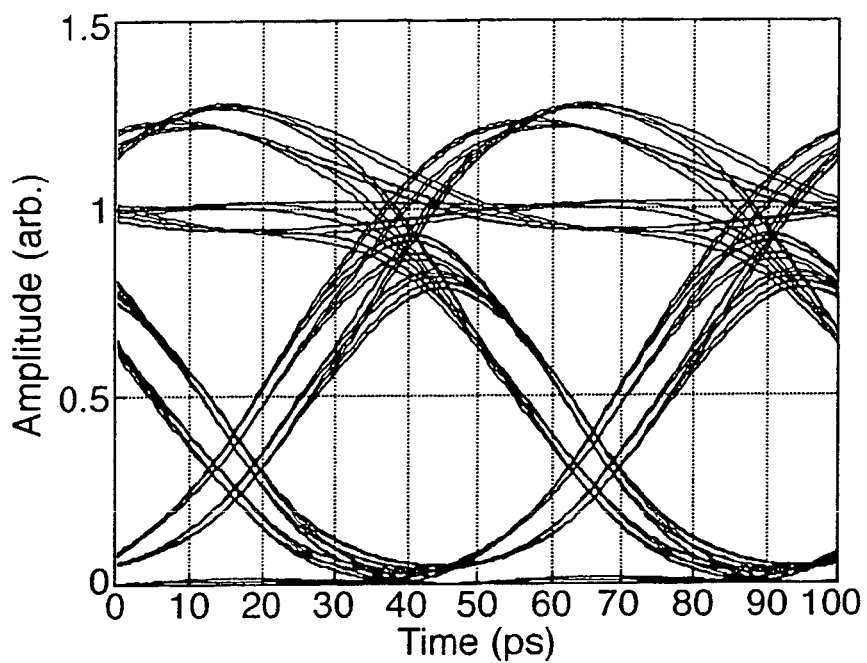
FIG. 9 shows simulated 20 Gbit/s "eye" diagrams for amplitude modulated NRZ data with (a) conventional (Butterworth response) optical filtering and (b) optical filtering in accordance with the invention.
Figure 9B:
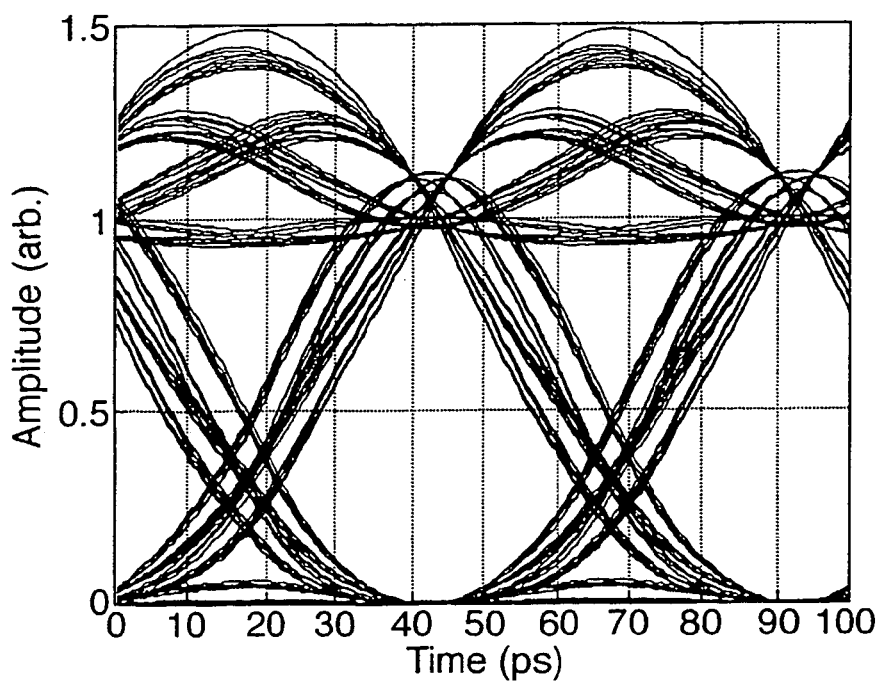

It is further found that the use of optical Nysquist filtering can also improve the system performance for other signalling formats such as binary amplitude keying as is illustrated with reference to FIGS. 9(a) and (b) which respectively show 20 Gbit/s "eye" diagrams for amplitude NRZ modulated data with conventional filtering (Butterworth response) and with Nyquist filtering in accordance with the invention. The use of Nyquist filtering, that is optical filtering using a filter having a response which is selected to minimise inter-symbol interference for each symbol at the sampling time, is considered inventive its own right irrespective of the modulation format.

It will be appreciated that the present invention is not limited to the specific embodiment described and that variations can be made which are within the scope of the invention. Whilst the use of optical differential quaternary phase shift keying (DQPSK) to modulate an optical carrier is considered inventive in its own right it is also envisaged to use other multi-level (M-ary) DPSK in which $M=2^n$ where n is an integer n=2, 3, . . . . Furthermore, whilst the use of MZIs in the modulator arrangement is particularly preferred, other phase modulators can be used to phase modulate the optical carrier. These include, for example, concatenated phase modulators or a single phase modulator driven with a multi-level drive signal.

What is claimed is:

1. A method of transmitting a plurality n of binary digital baseband data streams, comprising:

differentially pre-coding the plurality of baseband data streams to form a plurality of baseband drive signals, directly driving an optical phase modulator means with the plurality of drive signals to generate a differential M-ary ($M=2^n$) phase shift key-modulated optical carrier signal;

transmitting the differential M-ary phase shift key-modulated optical carrier signal from said optical phase modulator means;

optically demodulating the differential M-ary phase shift key-modulated optical carrier signal using a first interferometer, free of a local oscillator, having first and second arms and first and second outputs, and using a second interferometer, free of a local oscillator, having first and second arms and first and second outputs; the first and the second interferometers each utilizing an optical delay of substantially one symbol period and imparting a relative phase shift for the optical carrier between its respective first and second arms such that there is a difference of $\pi/2$ radians between the relative phase shifts of the first and the second interferometers for the optical carrier frequency;

performing balanced detection using a first balanced optical detector at the outputs of the first interferometer; and performing balanced detection using a second balanced optical detector at the outputs of the second interferometer.

2. A wavelength division multiplex (WDM) optical communication system having one or more optical wavelength channels characterized by the optical wavelength channels being modulated in accordance with the method of claim 1.

3. A WMD communications system according to claim 2, further comprising optical filtering means for filtering each of the differential M-ary phase shift key modulated wavelength channel before multiplexing them to form a WDM signal, and wherein the optical filtering means has an optical characteristic which is selected to minimize inter-symbol interference at the sample time for each symbol.

4. A WDM communications system according to claim 3, wherein the optical filtering means has a characteristic which is substantially a squared raised-cosine.

5. A WDM communication system according to claim 3, wherein the filtering means has a transmission characteristic $G(f)$ given by:

$$G(f) = \begin{cases} 1 & \text{for } 0 \le |f - f_0| \le \dfrac{1-\alpha}{2T} \\ \dfrac{1}{4}\left(1 - \sin\left[\dfrac{\pi T}{\alpha}\left(|f - f_0| - \dfrac{1}{2T}\right)\right]\right)^2 & \text{for } \dfrac{1-\alpha}{2T} \le |f - f_0| \le \dfrac{1+\alpha}{2T} \\ 0 & \text{for } |f - f_0| > \dfrac{1+\alpha}{2T} \end{cases}$$

where T is sampling period, $\alpha$ the excess bandwidth factor of the filter and $f_0$ the centre frequency of the WDM channel.

6. A WDM communications system according to claim 5, wherein the filter has an excess bandwidth factor of between 0.2 and 0.8.

7. A WDM communications system according to claim 3, wherein the optical filtering means comprises a respective optical filter for each wavelength channel.

8. A WDM communications system according to claim 7, wherein each filter comprises an optical fibre Bragg grating.

9. A modulator arrangement for modulating an optical carrier using a quaternary differential phase shift key (DQPSK technique) in dependence upon two binary digital baseband data streams in accordance with claim 1, comprising: phase modulating means operable to selectively modulate the phase of the optical carrier with phase shifts $0$, $\pi/2$, $\pi$, $3\pi/2$ radians in dependence upon the two binary digital baseband data streams.

10. A modulator arrangement according to claim 9, wherein the phase modulating means comprises optical splitting means for splitting the optical carrier into two optical signals which are applied to a respective Mach Zehnder modulator which is operable to selectively modulate the phase of the optical signal by $\pm\pi$ radians in dependence upon a respective drive voltage; a fixed phase shifter for applying a phase shift of $\pi/2$ to one said optical signals; and means for combining said modulated optical signals to produce a DQPSK technique modulated signal.

11. A modulator arrangement according to claim 10, wherein each Mach Zehnder modulator has an optical transmission versus drive voltage characteristic which is cyclic and which has a period of $2V_\pi$ and in which the modulators are operable on a part of said characteristic to give minimum transmission and in which the drive voltages have values of $\pm V_\pi$.

12. A demodulator arrangement for demodulating a quaternary differential phase shift key (DQPSK) modulated optical signal that has been modulated in accordance with claim 1, comprising: optical splitting means for splitting the DQPSK modulated optical signal, two unbalanced Mach Zehnder interferometers to which respective parts of the modulated optical signal are applied; and a respective balanced optical to electrical converter connected across the optical outputs of each interferometer; wherein each Mach Zehnder interferometer is operable to further impart a relative phase shift between its respective arms such that there is a difference of $\pi/2$ radians between said relative phase shifts of the Mach Zehnder interferometers.

13. A demodulator arrangement according to claim 12, wherein the Mach Zehnder interferometers are respectively operable to impart phase shifts of $\pi/4$ and $-\pi/4$ radians.

14. A method according to claim 1, comprising two of said optical phase modulator means, each of which modulates a part of the optical carrier, the two parts of the modulated carrier being recombined to generate the differential M-ary phase shift key optical phase modulated optical signal.

15. A method according to claim 1, wherein M=4.

16. A method according to claim 1, wherein the demodulated differential M-ary (M=2n) phase shift key optical carrier signal comprises differential signal components.

* * * * *